(12) United States Patent
Vo et al.

(10) Patent No.: US 11,030,217 B2
(45) Date of Patent: Jun. 8, 2021

(54) BLOCKCHAIN IMPLEMENTING CROSS-CHAIN TRANSACTIONS

(71) Applicant: International Business Machines Corporation, Armonk, NY (US)

(72) Inventors: Hoang Tam Vo, Southbank (AU); Lenin Mehedy, Doncaster East (AU); Mukesh K. Mohania, New Delhi (IN); Ziyuan Wang, Malvern East (AU); Ermyas Abebe, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 15/967,683

(22) Filed: May 1, 2018

(65) Prior Publication Data
US 2019/0340266 A1    Nov. 7, 2019

(51) Int. Cl.
*G06F 16/27* (2019.01)
*G06F 16/23* (2019.01)
(Continued)

(52) U.S. Cl.
CPC .......... *G06F 16/27* (2019.01); *G06F 16/2365* (2019.01); *G06F 16/9024* (2019.01);
(Continued)

(58) Field of Classification Search
CPC .. G06F 16/27; G06F 16/2365; G06F 16/9024; G06F 21/64; H04L 2209/12;
(Continued)

(56) References Cited

U.S. PATENT DOCUMENTS 9,608,829 B2    3/2017   Spanos et al.
9,785,369 B1    10/2017  Ateniese et al.
(Continued)

FOREIGN PATENT DOCUMENTS

CN    107301600 A    10/2017
CN    107888562 A    4/2018
(Continued)

OTHER PUBLICATIONS

Hui Wang et al. "Blockchain Router: A Cross-Chain Communication Protocol"; IEEA'17, Mar. 29-31, 2017 (Year: 2017).*
(Continued)

*Primary Examiner* — Dennis Truong

(57) ABSTRACT

An example operation may include one or more of storing, via a master chain, partition information that links together storage across a plurality of blockchains, receiving a request to execute a blockchain transaction from a client, determining whether the blockchain transaction is associated with data stored on one blockchain or data stored separately on different blockchains based on the partition information stored on the master chain, and, in response to a determination that the blockchain transaction is associated with data stored separately on different blockchains, identifying, via the master chain, a location of each blockchain from among the different blockchains and transmitting the locations to a system configured to perform the blockchain transaction.

20 Claims, 10 Drawing Sheets

(51) Int. Cl.
*H04L 9/32* (2006.01)
*G06F 21/64* (2013.01)
*G06F 16/901* (2019.01)

(52) U.S. Cl.
CPC ............ *G06F 21/64* (2013.01); *H04L 9/3236* (2013.01); *H04L 9/3247* (2013.01); *H04L 2209/12* (2013.01); *H04L 2209/38* (2013.01); *H04L 2209/56* (2013.01)

(58) Field of Classification Search
CPC ............... H04L 9/3247; H04L 2209/56; H04L 2209/38; H04L 9/3236; H04L 9/0637; G06Q 20/0658; G06Q 20/389; G06Q 20/401; G06Q 20/4014; G06Q 2220/00; G06Q 2220/10
See application file for complete search history.

(56) References Cited

U.S. PATENT DOCUMENTS

| | | | |
|---|---|---|---|
| 10,346,428 B2* | 7/2019 | Madhavan | G06Q 30/0609 |
| 10,404,471 B1* | 9/2019 | Griffin | H04L 9/3247 |
| 10,630,808 B1* | 4/2020 | Watt | H04L 47/125 |
| 10,740,733 B2* | 8/2020 | Moir | G06F 16/27 |
| 2016/0260169 A1 | 9/2016 | Arnold et al. | |
| 2016/0330034 A1* | 11/2016 | Back | G06Q 20/065 |
| 2016/0342977 A1 | 11/2016 | Lam | |
| 2017/0011460 A1 | 1/2017 | Molinari et al. | |
| 2017/0083580 A1 | 3/2017 | Sheppard et al. | |
| 2017/0148016 A1 | 5/2017 | Davis | |
| 2017/0212781 A1* | 7/2017 | Dillenberger | G06F 9/5038 |
| 2017/0236104 A1 | 8/2017 | Biton | |
| 2017/0262862 A1 | 9/2017 | Aljawhari | |
| 2018/0005186 A1 | 1/2018 | Hunn | |
| 2018/0019867 A1* | 1/2018 | Davis | H04L 9/0637 |
| 2018/0113752 A1 | 4/2018 | Derbakova et al. | |
| 2018/0165476 A1* | 6/2018 | Carey | G06F 21/577 |
| 2018/0189753 A1* | 7/2018 | Konda | G06Q 20/06 |
| 2018/0316502 A1* | 11/2018 | Nadeau | G06N 20/00 |
| 2018/0337847 A1* | 11/2018 | Li | H04L 67/1029 |
| 2018/0341930 A1* | 11/2018 | Moir | G06F 16/27 |
| 2018/0375840 A1 | 12/2018 | Moy et al. | |
| 2019/0058581 A1* | 2/2019 | Wood | G06F 21/602 |
| 2019/0066068 A1* | 2/2019 | Mitchell | G06F 21/62 |
| 2019/0066101 A1* | 2/2019 | Mitchell | G06Q 20/3829 |
| 2019/0081793 A1* | 3/2019 | Martino | H04L 9/0894 |
| 2019/0095879 A1* | 3/2019 | Eyal | G06Q 20/06 |
| 2019/0102163 A1 | 4/2019 | Witherspoon | |
| 2019/0122317 A1 | 4/2019 | Hunn et al. | |
| 2019/0171849 A1* | 6/2019 | Assenmacher | G06F 21/64 |
| 2019/0180311 A1 | 6/2019 | Chan et al. | |
| 2019/0188711 A1* | 6/2019 | Wu | G06Q 20/065 |
| 2019/0199787 A1 | 6/2019 | Carver et al. | |
| 2019/0236559 A1* | 8/2019 | Padmanabhan | H04L 9/3297 |
| 2019/0236562 A1* | 8/2019 | Padmanabhan | H04L 67/1095 |
| 2019/0236598 A1* | 8/2019 | Padmanabhan | G06N 3/0454 |
| 2019/0236606 A1* | 8/2019 | Padmanabhan | G06Q 20/4014 |
| 2019/0244306 A1* | 8/2019 | Kursun | G06F 16/137 |
| 2019/0251199 A1* | 8/2019 | Klianev | G06Q 40/04 |
| 2019/0287175 A1* | 9/2019 | Hill | G06Q 40/04 |
| 2019/0305943 A1* | 10/2019 | Hoersten | H04L 9/14 |
| 2019/0349426 A1* | 11/2019 | Smith | H04L 67/104 |
| 2020/0118092 A1* | 4/2020 | Gauvreau | G06F 16/2379 |
| 2020/0119926 A1* | 4/2020 | Buki | H04L 9/0637 |
| 2020/0162264 A1* | 5/2020 | Zamani | H04L 9/3297 |
| 2020/0267020 A1* | 8/2020 | Doney | H04L 12/4625 |

FOREIGN PATENT DOCUMENTS

| | | |
|---|---|---|
| WO | 2017021155 A1 | 2/2017 |
| WO | 2017145009 A1 | 8/2017 |
| WO | 2017163220 A1 | 9/2017 |
| WO | 2017167550 A1 | 10/2017 |

OTHER PUBLICATIONS

Luu et al. "A Secure Sharding Protocol For Open Blockchains"; CCS'16, Oct. 24-28, 2016 (Year: 2016).*
Al-Bassam et al.; "Chainspace: A Sharded Smart Contracts Platform", Cornell University Library, Cryptography and Security, arXiv:1708.03778v1[cs.CR],Aug. 12, 2017,pp. 1-16.
Ballabio, Gerardo; "Prime-Partitioned Block Chain: A Scalable and Efficient Block Chain Implementation", Social Science Research Network eLibrary, Feb. 25, 2017,pp. 1-14.
McConaghy et al.; "BigchainDB: A Scalable Blockchain Database", ascribe GmbH, Berlin, German, Jun. 8, 2016, pp. 1-16.
Sarr et al.; "Blockchain-Based Model for Social Transactions Processing", DATA-2015 4th International Conference On, Jul. 2015, pp. 309-315.
Buterin, "Chain Interoperability", http://www.r3cev.com/s/Chain-Interoperability-8g6f.pdf; Sep. 9, 2016.
International Search Report and Written Opinion issued in the corresponding International Application No. PCT/EP2019/060886, dated Jul. 16, 2019.
Li et al., "Towards Scalable and Private Industrial Blockchains", proceedings of teh ACM Workshop on Blockchain, Cryptocurrencies and Contracts, Apr. 2, 2017, pp. 9-14.
List of IBM Patents or Patent Applications Treated as Related, May 1, 2018.
Hoang Tam Vo, Blockchain Implementing Cross-Chain Transactions, U.S. Appl. No. 15/967,728, filed May 1, 2018 (a copy is not provided as this application is available to the Examiner).

* cited by examiner

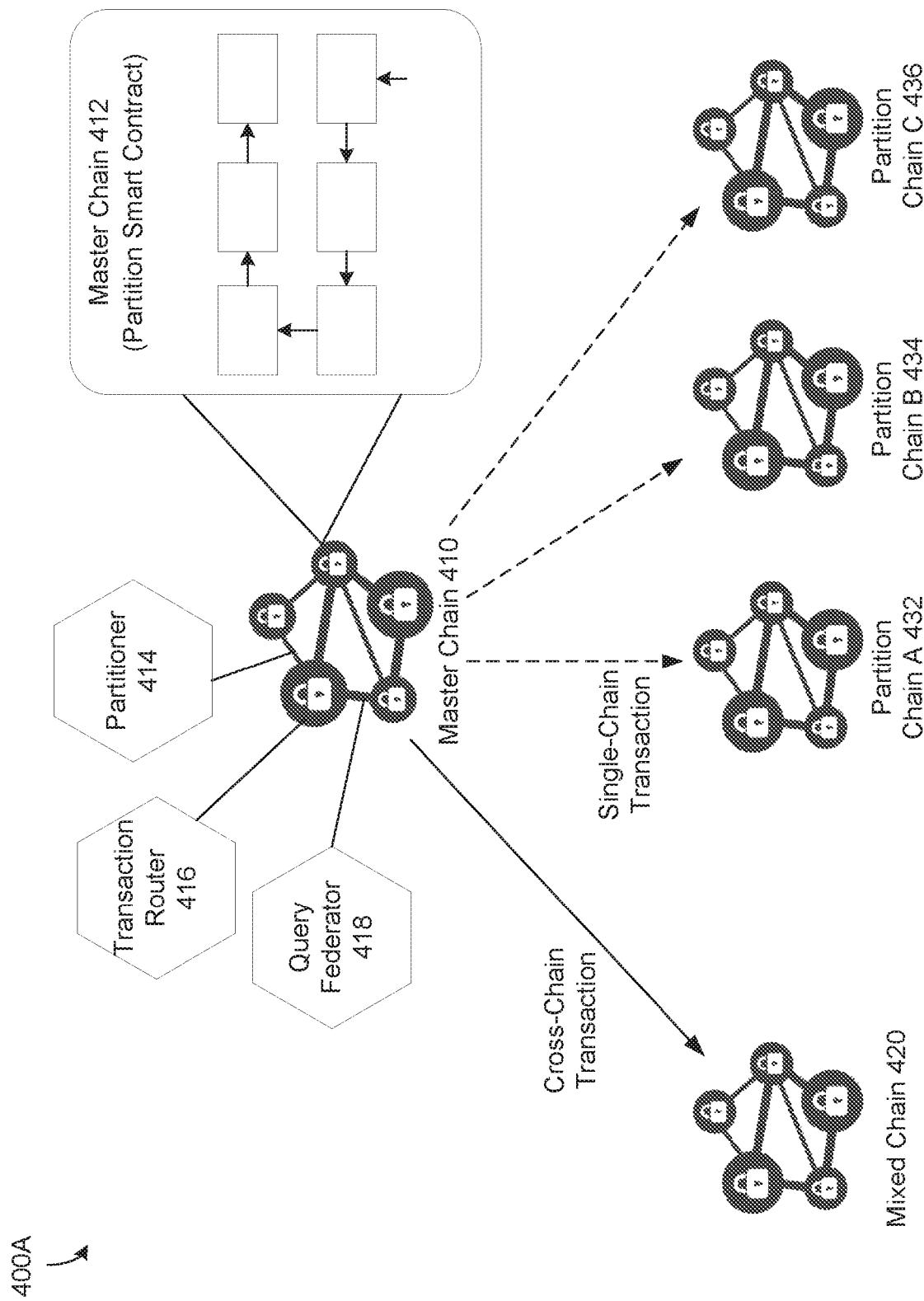

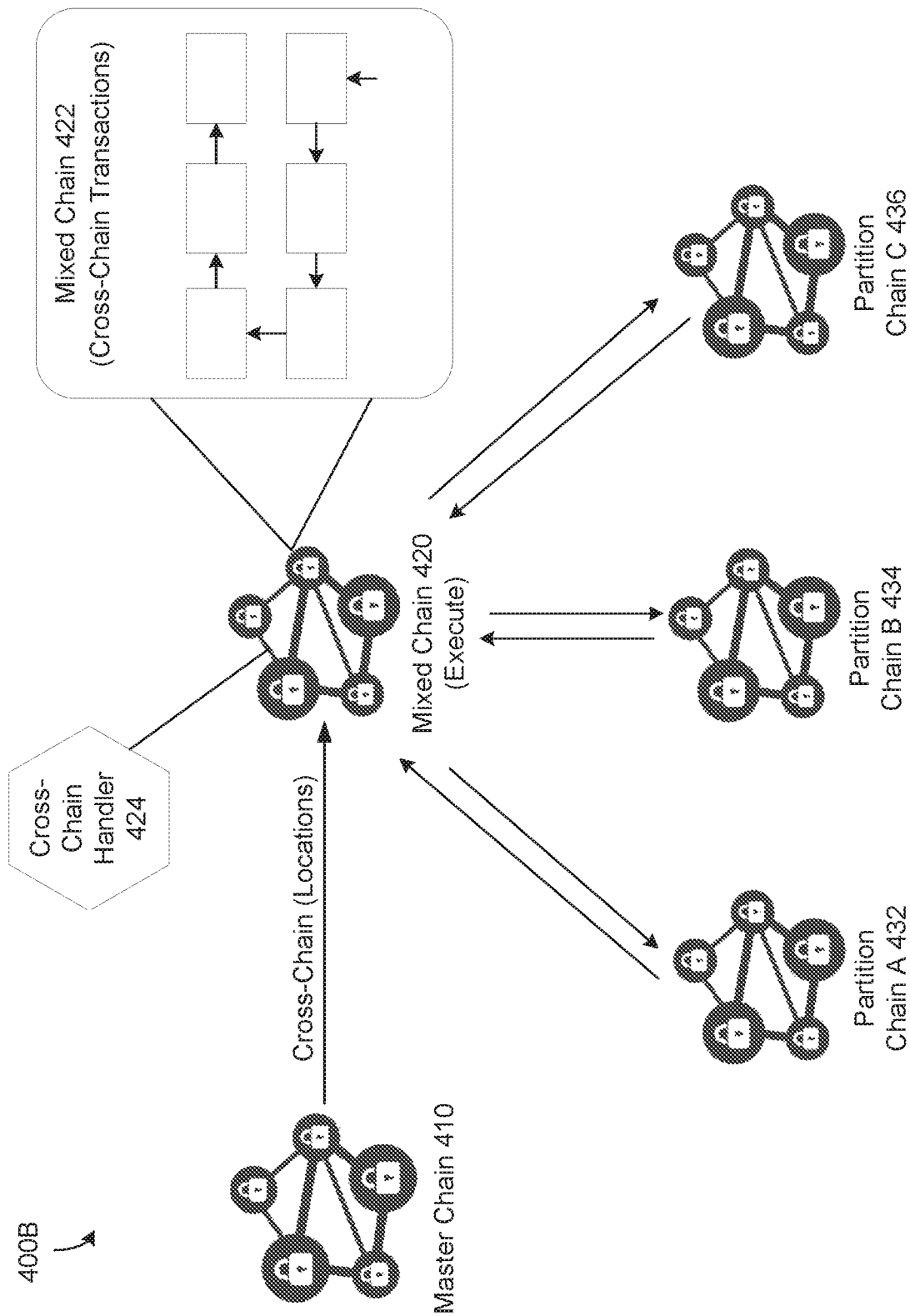

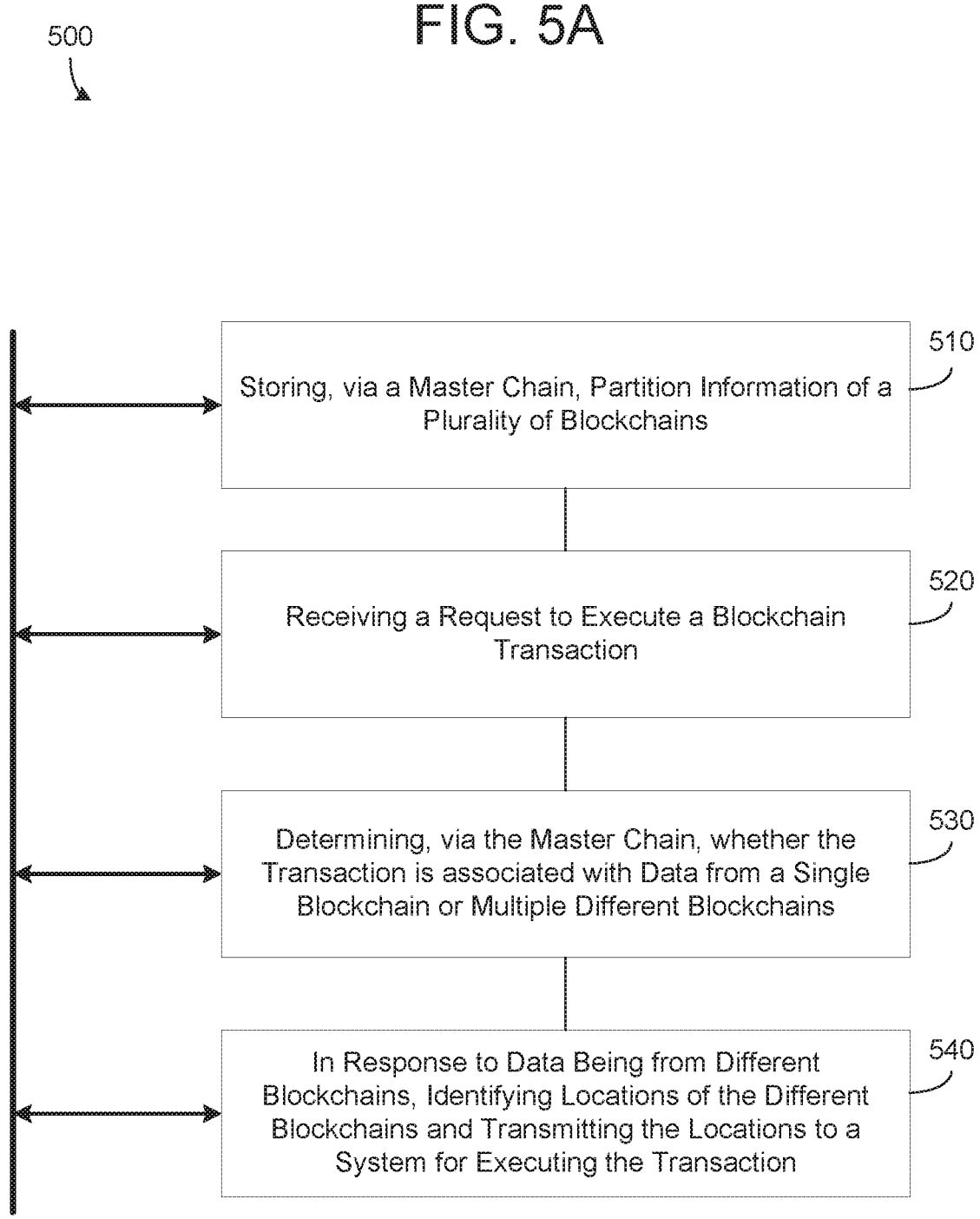

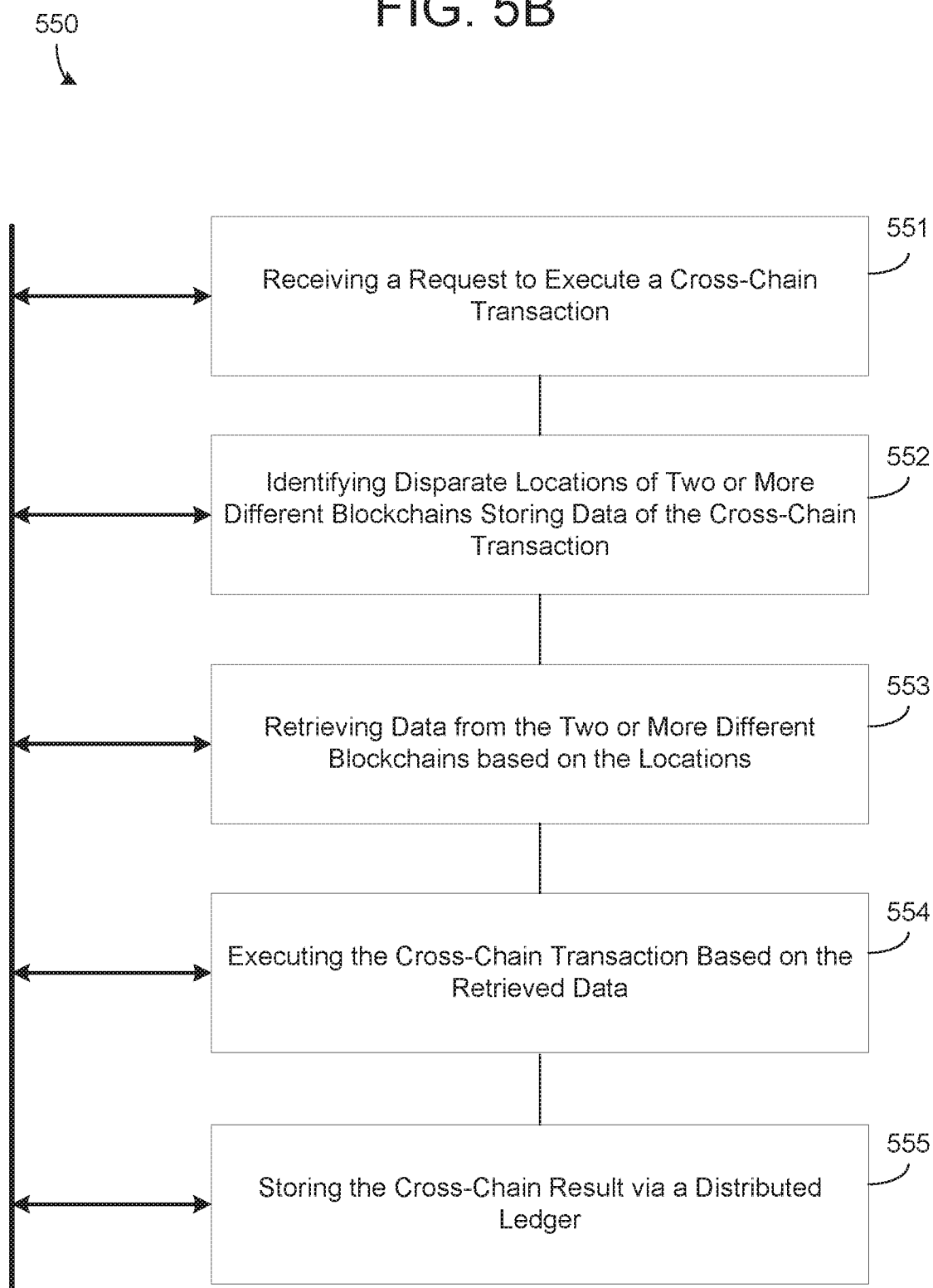

600

700 FIG. 7
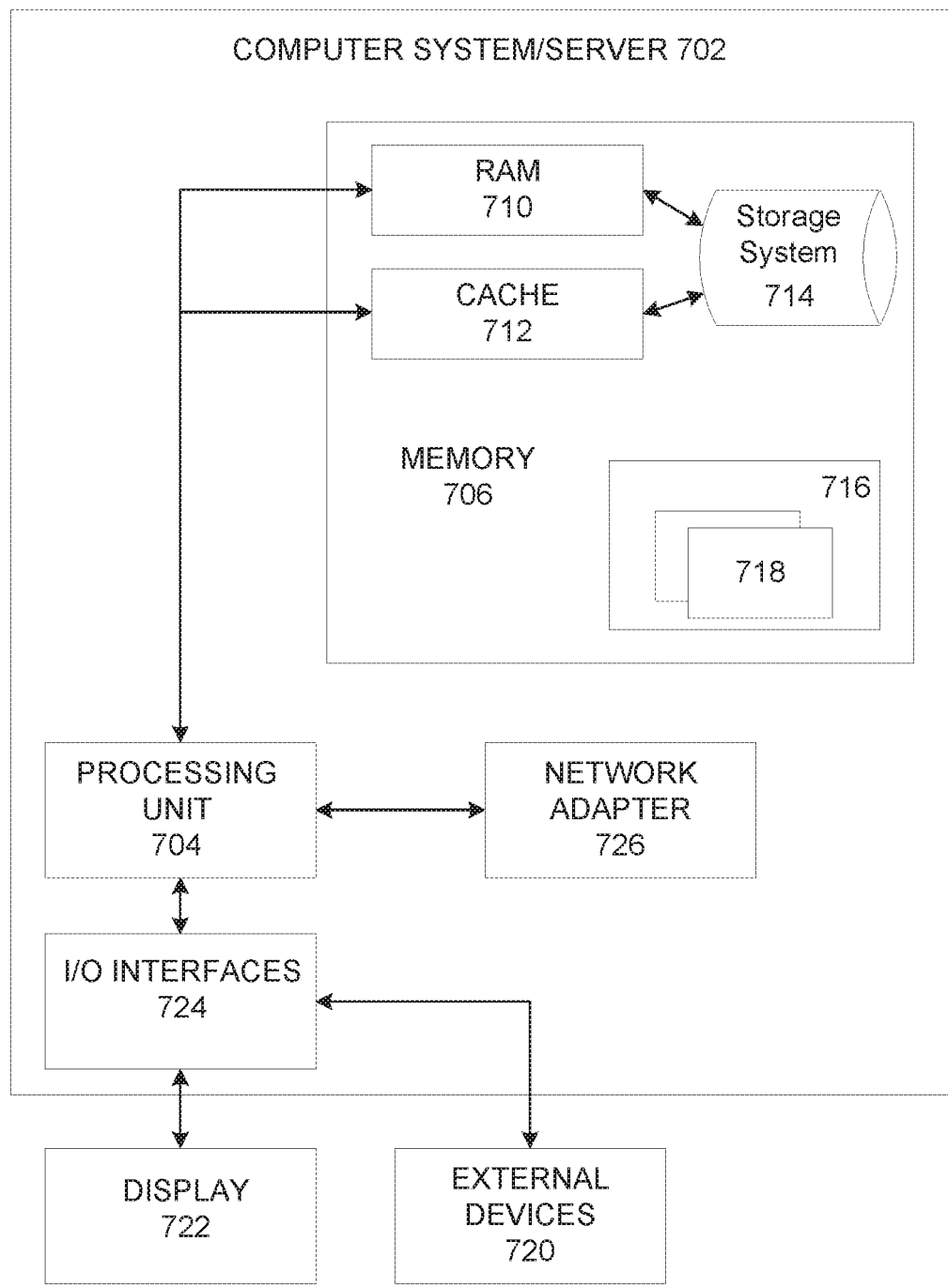

BLOCKCHAIN IMPLEMENTING CROSS-CHAIN TRANSACTIONS

TECHNICAL FIELD

This application generally relates to partitioning transaction data across multiple blockchains, and more particularly, relates to a blockchain implementing cross-chain transactions.

BACKGROUND

A ledger is commonly defined as an account book of entry, in which transactions are recorded and visible to authorized users. A distributed ledger is ledger that is replicated in whole or in part to multiple computing system. One type of distributed ledger is a cryptographic distributed Ledger (CDL) which can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

The distributed ledger is a continuously growing list of records that typically apply cryptographic techniques such as storing cryptographic hashes relating to other blocks. Although, primarily used for financial transactions, a blockchain can store other assets such as information related to goods and services (i.e., products, packages, status, software, data, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Furthermore, each block contains a timestamp and a link to a previous block thereby creating a tamper-proof chain of transaction history. Because a blockchain is a distributed system, before adding a transaction to a blockchain ledger, peers need to reach a consensus status.

Limited transaction throughput and storage are widely understood problems of blockchain technology. Certain technologies have made attempts to improve transaction throughput. For example, a blockchain in Bitcoin uses a proof of work consensus method that is easy to verify but which is computationally expensive (by design) and requires solving a cryptographic puzzle in the process. As another example, permissioned blockchains use consensus methods based on variants of byzantine fault-tolerant (BFT) state machines. These BFT state machines are chosen to provide higher transaction throughput and lower consensus latency but still do not provide the throughput necessary for many industries. That is, even with these improvements, current blockchain technology is not suited for large-scale data processing workloads commonly found in real-world applications for finance, insurance, software development, supply chain, transportation industry, and many others. As such, what is needed is a mechanism for expanding the throughput of a blockchain.

SUMMARY

One example embodiment may provide a method that includes one or more of storing, via a master chain, partition information that links together storage across a plurality of blockchains, receiving a request to execute a blockchain transaction from a client, determining whether the blockchain transaction is associated with data stored on one blockchain or data stored separately on different blockchains based on the partition information stored on the master chain, and, in response to a determination that the blockchain transaction is associated with data stored separately on different blockchains, identifying, via the master chain, a location of each blockchain from among the different blockchains and transmitting the locations to a system configured to perform the blockchain transaction.

Another example embodiment may provide a system that includes a storage configured to store, via a master chain, partition information that links together storage across a plurality of blockchains, and a processor configured to perform one or more of receive a request to execute a blockchain transaction from a client, determine whether the blockchain transaction is associated with data stored on one blockchain or data stored separately on different blockchains based on the partition information stored on the master chain, and in response to a determination that the blockchain transaction is associated with data stored separately on different blockchains, identify, via the master chain, a location of each blockchain from among the different blockchains and transmit the locations to a system configured to perform the blockchain transaction.

A further example embodiment may provide a non-transitory computer readable medium comprising instructions, that when read by a processor, cause the processor to perform one or more of storing, via a master chain, partition information that links together storage across a plurality of blockchains, receiving a request to execute a blockchain transaction from a client, determining whether the blockchain transaction is associated with data stored on one blockchain or data stored separately on different blockchains based on the partition information stored on the master chain, and, in response to a determination that the blockchain transaction is associated with data stored separately on different blockchains, identifying, via the master chain, a location of each blockchain from among the different blockchains and transmitting the locations to a system configured to perform the blockchain transaction.

BRIEF DESCRIPTION OF THE DRAWINGS

FIG. 4A is a diagram illustrating a process of a master chain managing data partitioning across a plurality of partition blockchains according to example embodiments.

FIG. 4B is a diagram illustrating a process of a mixed chain executing a cross-chain transaction based on data from a plurality of partition blockchains according to example embodiments.

FIGS. 5A and 5B are diagrams illustrating methods of managing cross-chain transactions, according to example embodiments.

FIG. 7 is a diagram illustrating a computer system configured to support one or more of the example embodiments.

DETAILED DESCRIPTION

Figure 1:
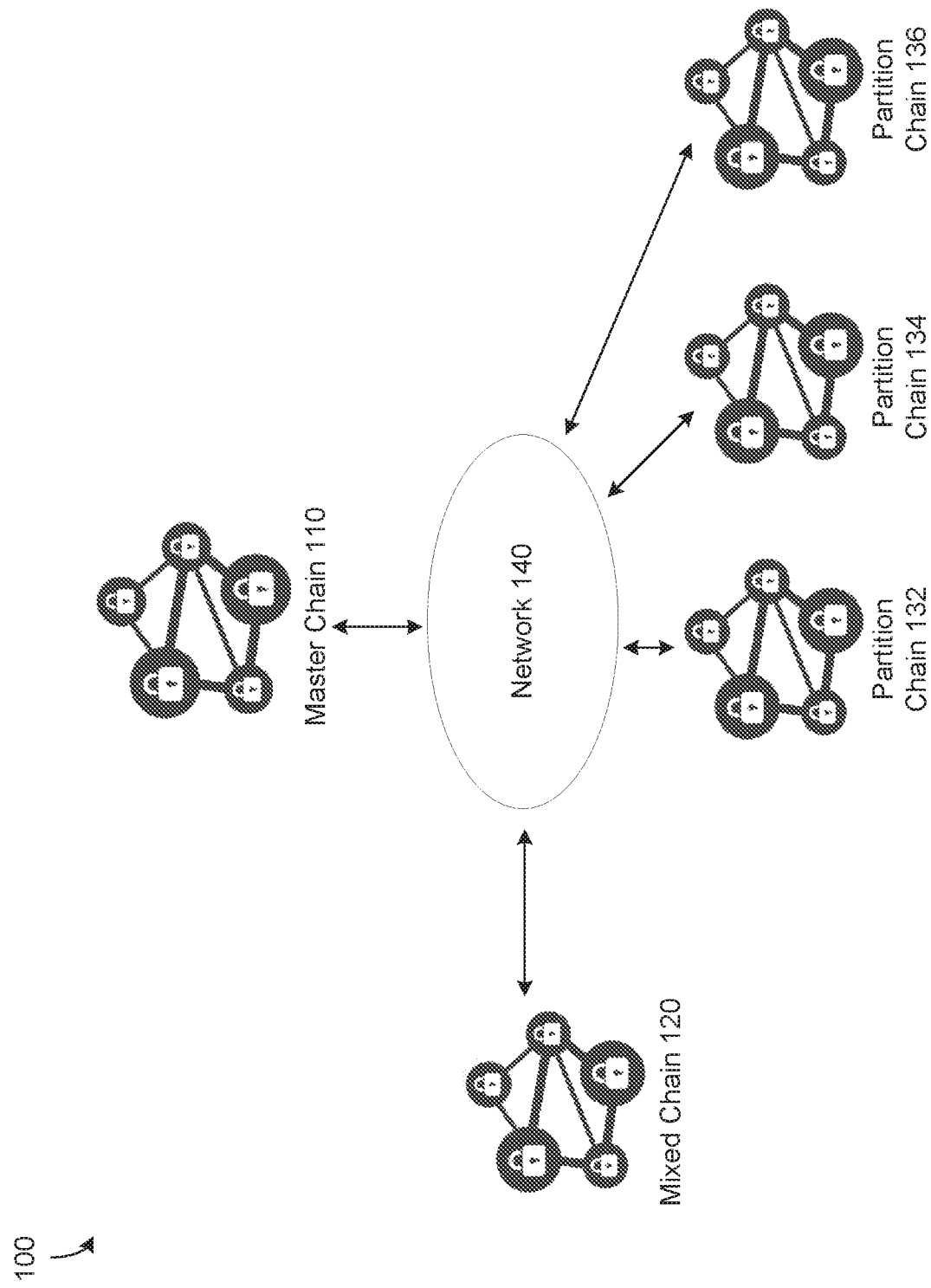
FIG. 1 is a diagram illustrating a system for managing cross-chain transactions, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The example embodiments are directed to methods, devices, networks and/or systems, which support a master blockchain system. The system includes a network of blockchains including a master blockchain that performs the role of an orchestrator or transaction router among the blockchains, a set of partition blockchains that store partitioned data. Furthermore, the system includes a mixed blockchain chain that retrieves data from multiple blockchains and executes cross-chain transactions by leveraging the data from the multiple blockchains. Some of the benefits of blockchain system is that it improves the capacity of a blockchain-based system in terms of both storage and transaction throughput. Specifically, in comparison to a single blockchain network, multiple (partitioned) blockchain networks can offer a much larger storage capacity (in aggregation) to store transaction data, and can further support a much greater number of concurrent transactions submitted from an application.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

According to various aspects, the partitioning function and the cross-chain execution function are implemented by newly defined smart contracts which are inherent and unique to blockchain. Furthermore, the example embodiments also provide a system-based transaction router smart contract that is configured to manage partitioning of data among a plurality of blockchains via access to system resources such as a network interface, etc. In response to receiving a request to execute a transaction, the transaction router smart contract (of the master chain) may identify multiple different blockchains having data for performing a transaction and provide locations of the different blockchains to the cross-chain handling smart contract (of the mixed chain). The cross-chain handling smart contract may retrieve the data from the different blockchains, execute the cross-chain transaction, and update the different blockchains based on the result of the cross-chain transaction.

Furthermore, additional blockchain attributes such as consensus, endorsement, and decentralized/distributed nodes are responsible for implementing the technical effect of the partition rule that determines which partitions (individual blockchains) to route an incoming transaction. Specifically, a consensus of participants (nodes) in the master blockchain may agree upon a common partitioning rule which can be used by the transaction router smart contract to route incoming transactions to appropriate partition chains. In one example, a single-chain transaction is simply routed to the respective partition chain where the data is stored. As another example, when a transaction involves data from multiple partition chains, the transaction may be routed to the mixed chain blockchain including the cross-chain handler which can retrieve the data and execute the cross-chain transaction. In some embodiments, the mixed-chain may also maintain its own blockchain having stored therein a hash-linked immutable record of cross-chains transactions.

The example embodiments provide numerous benefits over a traditional database. For example, through the network of blockchains the embodiments provide increased throughput and storage availability while also maintaining the level of trust and accountability required by a blockchain. Meanwhile, a traditional database could not be used to implement the example embodiments because a traditional database does not provide for consensus among nodes and thereby would rely on a single actor to decide how to partition the database. In this way, the single actor could change the partitioning scheme at their will and not based on an agreed upon consensus required by the master chain. Furthermore, the traditional database does not perform blockchain-based transactions where proof of transactions are stored on an immutable ledger that is only modifiable through consensus and endorsements.

In traditional database, data partitioning is typically employed to combat against data scalability, data isolation as well as transaction throughput issues within the database. Furthermore, newer storing technologies such as blockchain continue to have similar issues. In particular, with the growing interest in using permissioned blockchain (e.g., Hyperledger Fabric) to hold a transaction history of a business network, the business network faces the same technological barriers. At present, none of the current blockchain technologies have proposed a viable solution to scale transaction throughput of a blockchain via partitioning data across multiple blockchains. This is because, data partitioning is not a trivial solution for blockchain based applications and there are several technological challenges that need to be solved. For example, because blockchain maintains data immutability and trust using consensus among various parties, data partitioning also needs to provide the same level of trust, accountability as well as traceability. To address this issue, when data is partitioned into multiple blockchains, the system described herein may support "cross-chain" transactions thereby adapting to business networks that evolve over time. Furthermore, the system may partition data across multiple blockchains in order to support data partitioning as well as cross-chain transactions while maintaining trust, accountability and traceability. In particular, the blockchain system is able to (a) partition data across multiple blockchains; (b) support cross-chain transactions and (c) maintain trust, provenance and traceability.

The instant application in one embodiment relates to partitioning transaction data across multiple blockchains, and in another embodiment relates to a blockchain implementing cross-chain transactions.

FIG. 1 illustrates a system 100 of blockchains for managing cross-chain transactions, according to various example embodiments. Referring to FIG. 1, the system 100 includes a master chain network 110 (master chain), a mixed chain network 120 (mixed chain), and a plurality of partition blockchain networks. The blockchain networks may be connected to each other via a network 140 such as a private network, the Internet and/or the like. The system 100 may use a combination of blockchains in order to store transactions relevant to the partitioned data model in a business network, hence supporting scalability of the business network which can both increase storage capacity and transaction throughput dynamically over time as more storage is needed and/or transaction data grows. Overall, the proposed system includes the master chain 110 for routing incoming transactions and queries to appropriate partitions (i.e., mixed chain 120 or partition chains 132-136) where they can be processed. Meanwhile, the partitioned chains 132-136 are each responsible for maintaining data in a partition of the entire data domain. Furthermore, the mixed chain 120 may handle transactions that access data across multiple partitions.

The master chain 110 is the mechanism to route transactions based on a policy that is trusted by every party in the network. If a centralized router were used instead, the trustworthiness of the whole system would depend on this single entity which does not satisfy the requirements of blockchain. Therefore, the master chain 110 may persist and track changes in the partition rules via a blockchain including a chain of blocks hash-linked together. Once a partitioning policy is stored in the blockchain of the master chain 110, individual blockchain nodes in the master chain 110 may route transactions to other different blockchain networks (e.g., mixed chain 120, partitioned chains 132-136, etc.) based on the partition rules stored in the master chain. The partitioning rules/information stored by the master chain 110 may include data ranges allocated to each of the different partitioned chains 132, 134, and 136, which identifies data stored at each partitioned chain. Furthermore, the master chain 110 may store network endpoints of each of the partitioned chains 132, 134, and 136, enabling data to be retrieved from one or more nodes of the partitioned chains 132, 134, and 136.

According to various aspects, the master chain 110 may receive a request to process a transaction involving distinct data stored in several different blockchains, which is referred to herein as a cross-chain transactions. One option for handling a cross-chain transaction is to migrate data from several chains to a particular chain and then execute the transaction on that chain. However, this approach is not a feasible solution because it would introduce unnecessary delay and instability in the network. Instead, the system 100 includes the mixed chain 120 which handles cross-chain transactions provided from the master chain 110 by accessing data from different blockchains and creating transactions involving the different chains of data to create a mixing of transaction data among the different chains.

The transaction data may be partitioned across multiple partitioned blockchains 132, 134, and 136. The master chain 110 may identify locations of the data efficiently from these blockchains by building up an index based on a querying smart contract. For example, the querying may provide the master chain 110 with a location of transaction data that has not been accessed prior. Furthermore, the actual routing module, although it uses the partition rule stored in the master chain 110, needs to be trusted. Therefore, the routing module (i.e., transaction router) may be integrated with blockchain node software. For example, the routing module may be implemented via a special type of smart contract/chaincode such as system chaincode available in Hyperledger Fabric 1.0, for example. The system chaincode may be an integrated part of a blockchain software module. In contrast with a typical smart contract that accesses on-chain data, the system smart contract may be designed to have system level access, which otherwise is not available to traditional smart contract that is supposed to run in a sandbox.

Figure 2:
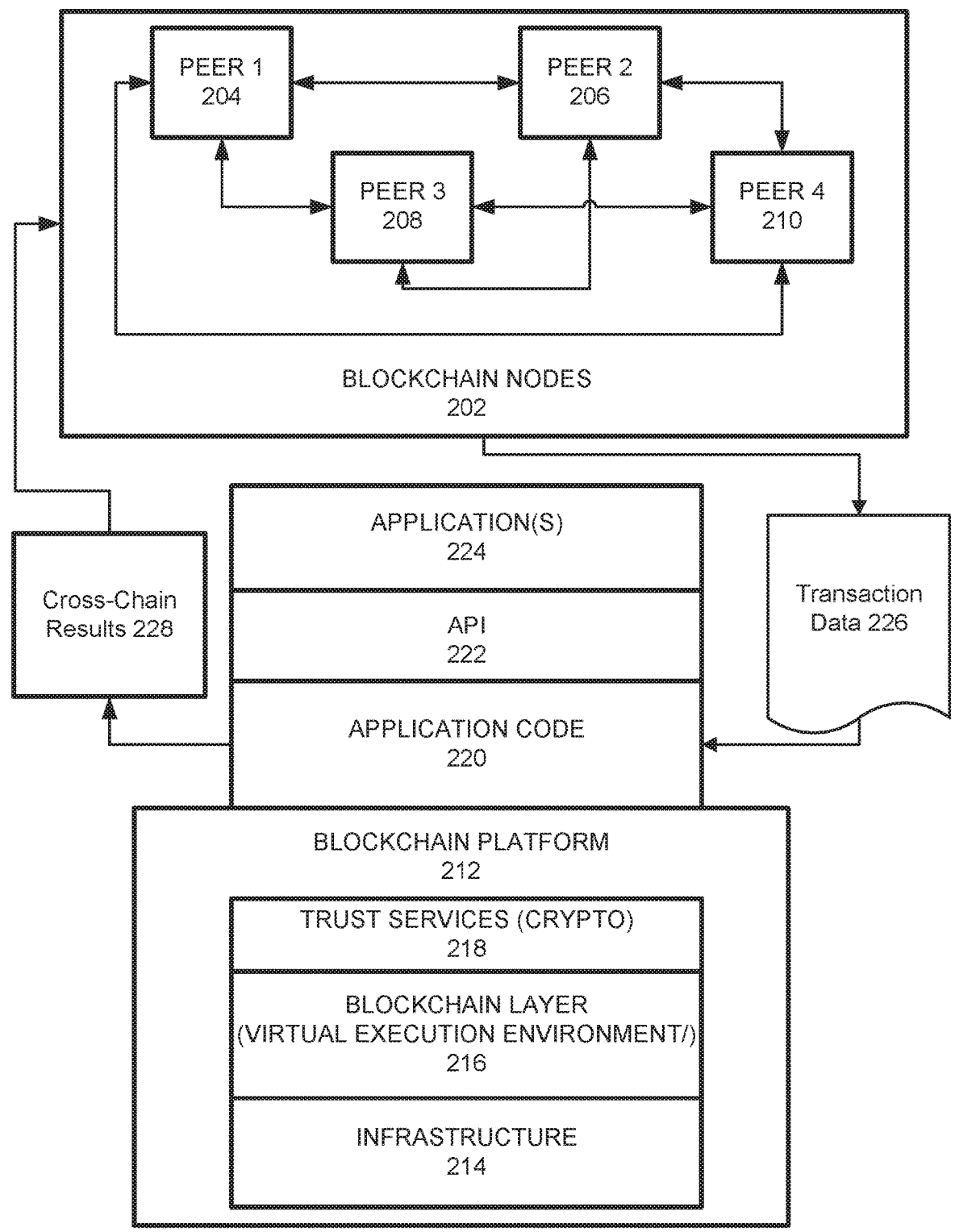
FIG. 2 is a diagram illustrating a peer node blockchain architecture configuration, according to example embodiments.

FIG. 2 illustrates a blockchain architecture configuration 200 of a blockchain, according to example embodiments. The configuration 200 may be an example of a traditional blockchain such as partitioning blockchains shown in FIG. 1. Referring to FIG. 2, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2 may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, transaction data 226 may be processed by one or more processing entities (e.g., virtual machines) included in the blockchain layer 216. The transaction data 226 may include a hash-linked chain of data blocks which link together transactions executed via the blockchain. For example, a most recent transaction may be stored in a tail block of the blockchain. A transaction result 228 may include transaction data 226 mixed with data from another blockchain via a cross-chain transaction. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2, the chaincode may introduce modifications to an asset via storage of data blocks representing results of executing a transaction. One function may be to add new values to the asset, change values of the asset, delete values of the asset, and the like, which may be distributed to and stored by one or more of the nodes 204-210.

A client may transmit a request to execute a blockchain transaction (e.g., a cross-chain transaction) and may include an application leveraging a supported software development kit (SDK), such as NODE, JAVA, PYTHON, and the like, which utilizes an available application programming interface (API) to generate a cross-chain transaction proposal. The proposal is a request to invoke a chaincode function so that data can be read and/or written to the ledger or multiple ledgers of different blockchains (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

The chaincode may be executed against a current state database to produce transaction results including a response value, read set, and write set. However, no updates are made to the ledger at this point. Rather, the set of values, along with an endorsing peer node's signature may be passed back as a proposal response to the SDK of the client which parses the payload for the application to consume.

In response, the application of the client inspects/verifies the endorsing peer's signatures and compares the proposal responses to determine if the proposal response is the same. If the chaincode only queried the ledger, the application would inspect the query response and would typically not submit the transaction to the ordering node service. If the client application intends to submit the transaction to the ordering node service to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, the client assembles endorsements into a transaction and broadcasts the transaction proposal of the asset and response within a transaction message to the ordering node. The transaction may contain the read/write sets, the endorsing peer's signatures, and a channel ID. The ordering node does not need to inspect the entire content of a transaction in order to perform its operation, instead the ordering node may simply receive transactions from all channels in the network, order them chronologically by channel, and create blocks of transactions per channel.

Figure 3:
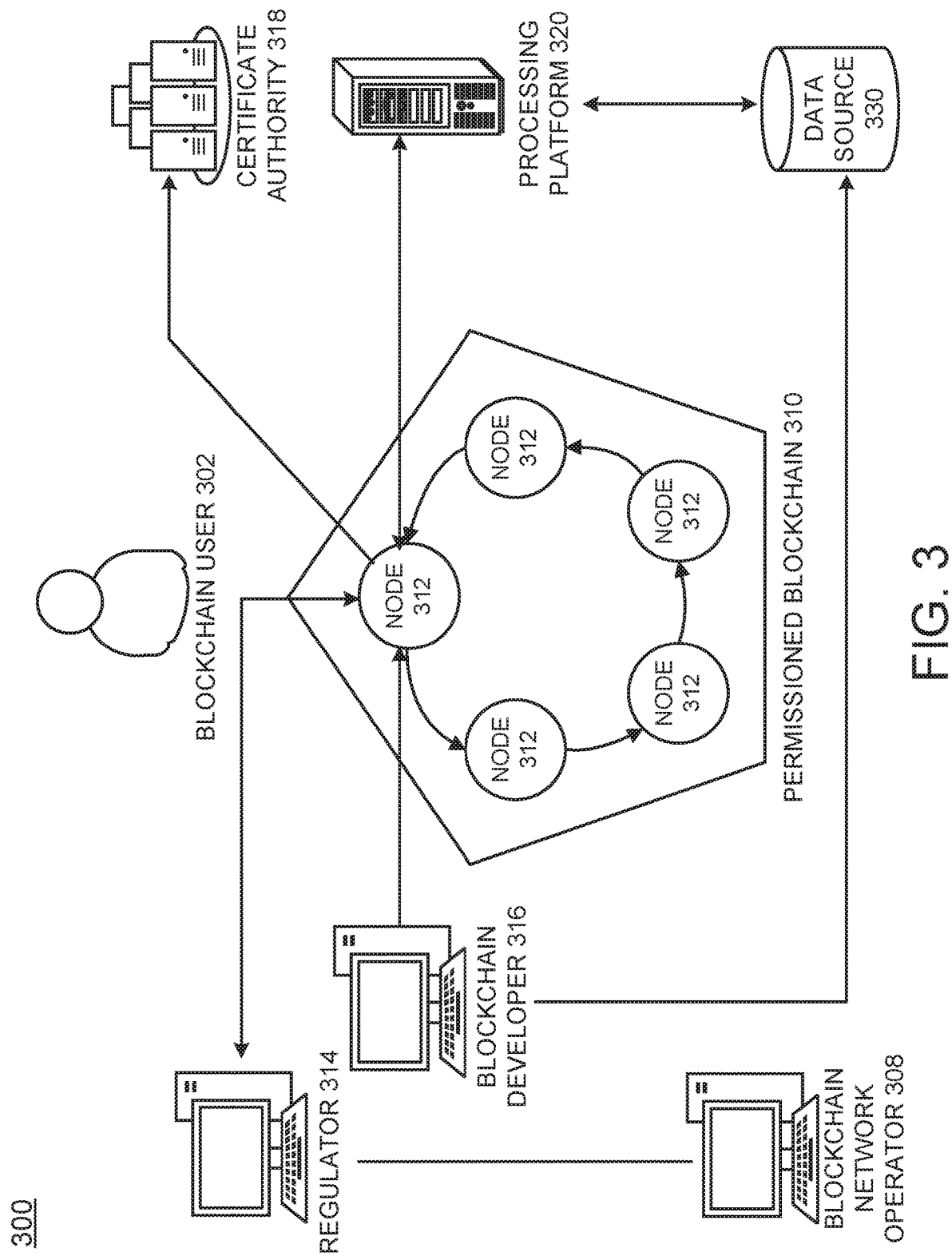
FIG. 3 is a diagram illustrating a permissioned blockchain network, according to example embodiments.

FIG. 3 illustrates an example of a permissioned blockchain network 300 of a single blockchain, which features a distributed, decentralized peer-to-peer architecture, and a certificate authority 318 managing user roles and permissions. Any of the master chain, the mixed chain, and the partition chains may be a permissioned blockchain network 300. In this example, the blockchain user 302 may submit a transaction to the permissioned blockchain network 310. The transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

FIG. 4A illustrates a process 400A of a master chain 410 managing data partitioning across a plurality of partition blockchains according to example embodiments, and FIG. 4B illustrates a process 400B of a mixed chain 420 executing a cross-chain transaction based on data from a plurality of partition blockchains according to example embodiments. Referring to FIG. 4A, the master chain 410 manages a blockchain 412 that includes a hash-linked chain of blocks of partitioning information about how data is partitioned among the different partition blockchains 432, 434, and 436. The entire domain may be split into sub-domains or subsets where each partition blockchain 432, 434, and 436 includes a unique sub-domain or subset that is exclusive of the other partition blockchains. Furthermore, the blockchain 412 may store information identifying network locations (e.g., endpoints, URLs, etc.) of a node of each partition blockchain 432, 434, and 436 for retrieving and providing transaction data.

For example, the functionality of the master chain 410 may be implemented via three corresponding smart contracts. In one example, a partitioner smart contract 414 maintains a consensus among parties (master chain nodes) on a partitioning function that determines how the entire data domain can be partitioned, e.g., range boundaries of data maintained in each partition of the data domains allocated to each partition blockchain 432-436. The master chain 410 may also include a transaction router smart contract 416 that routes the incoming transactions to the appropriate chain that is responsible (according to the partitioning function) to process the transactions. For example, single-chain transactions may be routed directly to the single chain where the transaction data is stored. Meanwhile, cross-chain transactions may be routed to the mixed chain 420 for processing. Routing information may be identified from the partitioning information stored in the blockchain 412.

The master chain 410 may also include a query federator smart contract 418 that is responsible for handling queries from the client. In some embodiments, the partitioner smart contract 414 may be a smart contract running inside each peer node in the master chain based on on-chain data, while the transaction router 416 and the query federator 418 may be special system smart contracts (aka system chaincode) that have the system level capability to access various other software components in the host node, which is however not available to a usual smart contract that runs inside a sandbox. Meanwhile, the partitioned blockchains 432, 434, and 436, may be traditional blockchain networks which maintain different partitions of the entire data domain without knowing the full domain. Each partitioned chain may run a single-chain handler' smart contract that receives the transaction and query requests from the master chain 410 and executes these requests.

Referring to FIG. 4B, the mixed chain 420 receives a cross-chain transaction from the master chain 410 and executes the cross-chain transaction. For example, the request received from the master chain 410 may include network locations of the blockchain networks that have data stored therein for the cross-chain transaction. Therefore, the mixed chain 420 can identify which partitioned blockchains among the plurality of partitioned blockchains 432, 434, and 436, that have data for the cross-chain transactions. The mixed chain 420 includes a cross-chain handler smart contract 424 that receives the transaction request from the master chain 41 and is responsible for accessing data across multiple partitions. Furthermore, the cross-chain handler 424 executes the cross-chain transaction thereby mixing data together from different partition blockchains to create a mixed result. The cross-chain handler 424 may store the results of the cross-chain transaction in a blockchain 422 which links together results of all cross-chain transactions performed in the system. Furthermore, the cross-chain handler 424 may also update the partition blockchains that provided data for the transaction with the results of the cross-chain transaction to enable the partition blockchains to update the data/assets stored therein.

According to various embodiments, the master chain 410 may be initialized with information of the endpoints of other blockchains (420, 432, 434, and 436). Within the master chain 410, each party in the network may come to a consensus of the partition rule off-network and one authorized party may invoke a "setPartitionRule" method in the partitioner smart contract 414 to set the partition rule in the blockchain 412. Any changes to the partition rule are also stored in the blockchain 412 making them traceable. After initialization, the partitioner smart contract 414 may set an enable flag so that every node in this master chain is able to fetch the partition rule and route transactions according to that rule. Furthermore, the transaction router smart contract 416 may first identify which data is accessed by these transactions. For example, the transaction router 416 may look up the partitioning rule from the blockchain through the partitioner smart contract 414. According to various embodiments, next, the transaction router 416 decides which blockchain network the transactions should be routed to. For example, if a transaction only accesses data within a single partition, then it will be routed to a particular partitioned blockchain network. On the contrary, transactions that access data in multiple partitions are routed to the mixed chain 420 network for processing.

Meanwhile, a workflow to process a transaction in the mixed chain 420 includes the cross-chain handler smart contract 424 receiving transactions and partition information from master chain's transaction router. In response, the cross-chain handler 424 fetches data from different chains, persists the fetched data as well as new values in its own chain 412, and initiates a separate "setDiff" transaction to update the latest value for different parties in the different partitioned chains. For example, if balance of 'X' is fetched from 'B-chain' 434 and balance of 'Y' is fetched from 'A-chain' 432, then after a balance transfer transactions from X to Y, the final balance differences of X and Y will be set using "setDiff" transaction in "B-chain" and vice versa. Thus the "mixed chain" will contain the cross-chain transactions, but also update the other relevant chains with a separate "setDiff" transaction to update the value by the delta changes. In some embodiments, if a cross-chain transaction is in process and there is a new incoming transaction that accesses some data common with the cross-chain transaction, this new transaction may be put on hold for a defined period of time or discarded immediately by the transaction router 416.

As another example, if a query accesses data based on the partitioning attribute that is included in the partitioning function, then the query federator 418 just routes the query to the particular partitioned chain maintaining the data of interest. In contrast, if the query accesses data based on a non-partitioning attribute, the query federator 418 may not be aware of where the data is stored between the different blockchain partitions. In this case, the query federator 418 may forward the query to every partitioned chain and aggregate the results returned by these chains prior to returning to the client.

As described, the mixed chain 420 may perform transactions across the different partition blockchains 432-436. For example, the transaction router 414 may read the user information contained in the incoming transaction and the partition rule maintained in its blockchain 412 (i.e., the master chain or partition smart contract). As a non-limiting example, the transaction router 414 may identify that the data record associated with user "U1" resides in partition A 432 whereas the data record associated with user "U2" resides in partition B 434. In this example, the transaction router 414 may update its lock table with the information that a cross-chain transaction is in progress for "U1" and "U2." Then this transaction may be forwarded to the mixed chain 420 with the detail of "U1", "U2" and their blockchain node URLs. In response, the cross-chain handler 424 may fetch the data for "U1" from partition A 432 and the data for "U2" from partition B 434. Furthermore, the cross-chain handler 424 may create a transaction in its own blockchain 422 and also send "SetDiff" transaction to U1's blockchain (partition A 432) with the delta of U1's balance and send a separate "SetDiff" transaction to U2's blockchain (partition B 434) with the delta of U2's balance.

FIG. 5A illustrates a method 500 of routing a transaction for cross-chain processing, according to example embodiments. For example, the method 500 may be implemented via a smart contract executed by a blockchain node within a master blockchain network. As another example, the method 500 may be performed by a group of computing nodes within the master blockchain network. Referring to FIG. 5A, in 510 the method may include storing, via a master chain, partition information that links together storage across a plurality of blockchains. For example, the partition information may include partition rules generated by a consensus of nodes of the master chain. The partition rules may identify ranges of data stored by each of a plurality of different blockchains as well as location information of each blockchain such as a uniform resource locator (URL) or the like. In some embodiments, the method may include establishing the partition information in response to detecting a consensus of the partition information from a plurality of blockchain nodes that manage the master chain.

In 520, the method may include receiving a request to execute a blockchain transaction from a client. For example, the client may request a transaction that leverages data from a single blockchain or a transaction that leverages data from multiple different blockchains. In 530, the method may include determining, via the master chain, whether the blockchain transaction is associated with data stored on one blockchain or data stored separately on different blockchains based on the partition information stored on the master chain. For example, the transaction may identify a particular asset or data item, and the partition information may identify where the asset or data item is stored based on a partitioner smart contract that manages the master chain and the partitioning information.

In response to a determination that the blockchain transaction is associated with data stored separately on different blockchains, in 540 the method may further include identifying, via the master chain, a location of each blockchain from among the different blockchains and transmitting the locations to a system configured to perform the blockchain transaction. In some embodiments, the transmitting may include transmitting the locations to a cross-chain handler smart contract executing on a mixed chain which is configured to retrieve respective data from each of the different blockchains and execute the blockchain transaction based on the data retrieved from the different blockchains.

In some embodiments, the partition information identifies an entire domain or range of transaction data managed by the master chain, and also identifies respective sub-domains allocated to each respective blockchain among the plurality of blockchains. Here, the partition information or subdomain information may identify boundary ranges of transaction data maintained by each blockchain among the plurality of blockchains.

In some embodiments, the method may further include individually querying the plurality of blockchains to determine at least one blockchain storing data for the blockchain transaction, when the master chain does not include an identity of a blockchain storing the data for the blockchain transaction. For example, the querying may be performed by a query federator smart contract executing on the blockchain node, while the determining may be performed by a transaction routing smart contract executing on the blockchain node. In some embodiments, the method may further include detecting an enablement flag that has been set via the master chain and fetching the partition information in response to detection of the enablement flag.

FIG. 5B illustrates a method 550 of executing a cross-chain transaction based on data from multiple blockchain networks, according to example embodiments. For example, the method 550 may be performed by a node of a mixed chain network. Referring to FIG. 5B, in 551, the method may include receiving a request to execute a cross-chain transaction. For example, the request may be received from a master chain that has identified a blockchain transaction that requires data from different blockchains. In 552, the method may include identifying disparate locations of two or more different blockchains that have stored therein data for the cross-chain transaction. For example, the mixed chain may identify network locations of blockchain nodes registered for communication with the mixed chain and having location information (e.g., URL, endpoint, etc.) stored in the master chain. In this example, the identifying may include identifying different network locations for accessing the two or more different blockchains, respectively, based on two or more URLs included in the request.

In 553, the method may include retrieving data from data blocks of the two or more different blockchains, respectively, based on the identified disparate locations. For example, the retrieving may include transmitting a request from the mixed chain to a blockchain node of each of the different blockchains requesting different data items (e.g. data ranges) of data that is stored on the different blockchains. Here, the data may be unique to each of the respective blockchains and not obtainable from the same blockchain. In 554, the method may include executing the cross-chain transaction which takes the retrieved data from the two or more different blockchains as inputs to generate a cross-chain result. For example, the executing of the cross-chain transaction may cause the retrieved data from the two or more different blockchains to be mixed together such as through an exchange of data, a combination of data, a subtraction of data, an addition of data, a modification of data, and the like.

In 555, the method may include storing the cross-chain result via a data block of a distributed ledger. For example, the storing may include inserting a new data block having stored therein information about the cross-chain result into each of the two or more different blockchains. In this example, the storing may include inserting a new data block having stored therein information about the cross-chain result into a first blockchain from among the two or more different blockchains to update transaction data obtained from the first blockchain with a delta value resulting from the cross-chain result. In some embodiments, the storing may include inserting a new data block having stored therein information about the cross-chain result into a mixed-chain blockchain based on the generated cross-chain result. In some embodiments, the storing further may include linking the new data block inserted into the mixed-chain blockchain to a cross-chain result of another cross-chain transaction previously stored in the mixed-chain blockchain.

Figure 6A:
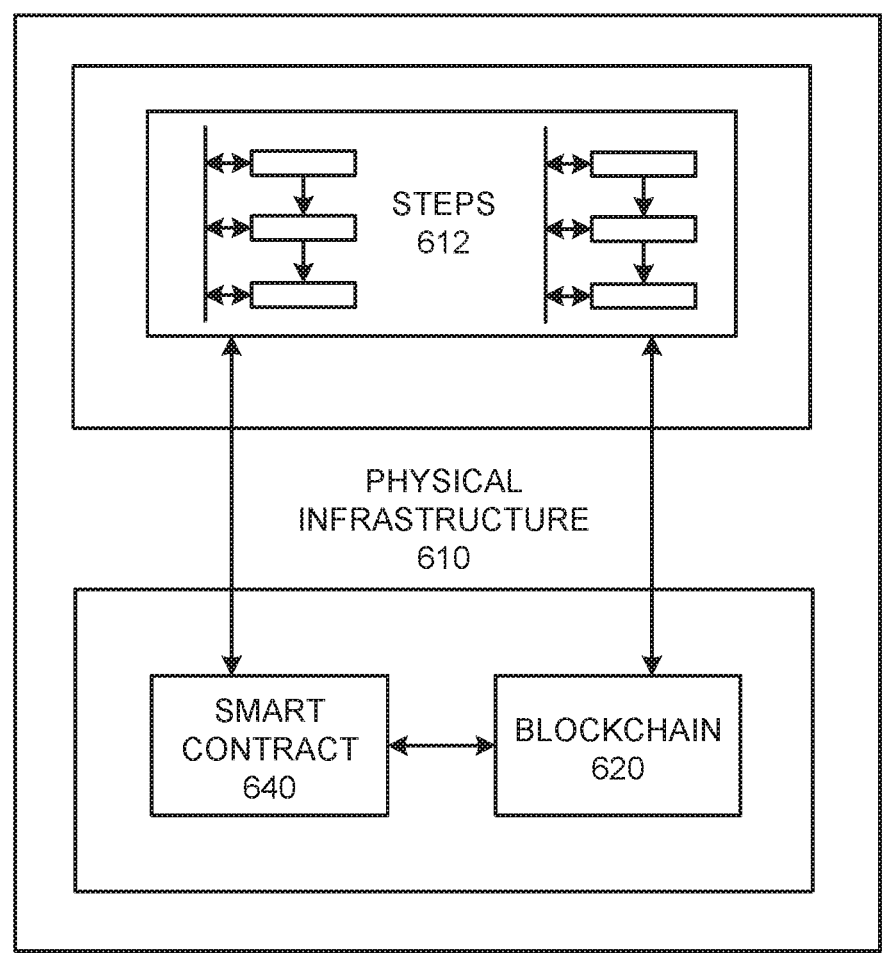
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. For example, the smart contract 640 may execute transactions and invoke changes to multiple different blockchain ledgers as a result of a cross-chain transaction being executed thereby updating a world state of multiple blockchains at the same time (i.e., simultaneously). In this example, the steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
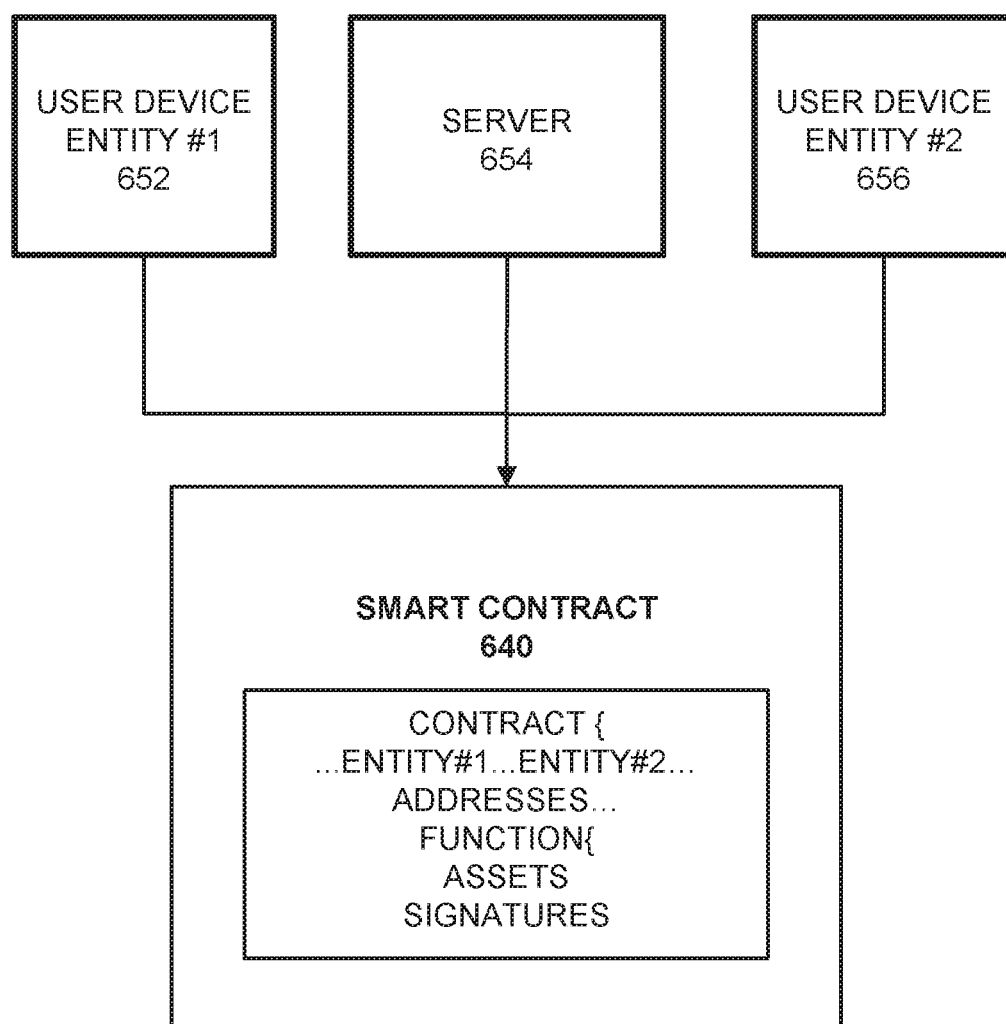
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

Examples of smart contracts include normal smart contracts which execute decisions based on data that is stored on-chain. For example, the partitioning smart contract of the master chain may identify and store partitioning rules via a blockchain on the master chain. Another example of a smart contract is a system smart contract that is configured to access data and functionality of a computing system outside of the chain (also referred to as off-chain). For example, the transaction router may identify network information and interact with a network interface of the system to route transactions to single-partition blockchains or the mixed chain. As another example, the query federator may interact with network information and the network interface of the system to transmit queries to other blockchains systems and receive responses.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, in one example, the computing system 702 may be a blockchain node included within the master chain described herein. In this example, the memory 704 may store a master chain that includes partition information such as rules, URLs, and the like, which links together storage across a plurality of different blockchains. The processor 704 may receive a request to execute a blockchain transaction from a client, and may determine whether the blockchain transaction is associated with data stored on one single blockchain or data stored separately on different blockchains based on the partition information stored on the master chain. In response to a determination that the blockchain transaction is associated with data stored separately on different blockchains, the processor 704 may identify, via the master chain, a location of each blockchain from among the different blockchains and transmit the locations to a system such as the mixed chain which configured to perform the cross-chain blockchain transaction.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a storage configured to store, via a master chain, partition information that links together storage across a plurality of blockchains; and
   a processor configured to receive a request to execute a blockchain transaction from a client, determine whether the blockchain transaction is associated with data stored on one blockchain or data stored separately on different blockchains based on the partition information stored on the master chain;
   wherein, in response to a determination that the blockchain transaction is associated with data stored separately on different blockchains, the processor is further configured to identify, via the master chain, a location of each blockchain from among the different blockchains and transmit the locations to a system configured to perform the blockchain transaction.

2. The computing system of claim 1, wherein the partition information identifies a domain of transaction data managed by the master chain, and identifies a sub-domain of the domain uniquely associated with each respective blockchain of the plurality of blockchains.

3. The computing system of claim 1, wherein the partition information identifies boundary ranges of transaction data maintained by each blockchain among the plurality of blockchains.

4. The computing system of claim 1, wherein the processor is further configured to individually query the plurality of blockchains to determine at least one blockchain that stores data for the blockchain transaction, when the master chain does not include an identity of a blockchain that stores the data for the blockchain transaction.

5. The computing system of claim 1, wherein the processor is further configured to establish the partition information in response to detection of a consensus of the partition information from a plurality of blockchain nodes that manage the master chain.

6. The computing system of claim 1, wherein the processor is further configured to detect an enablement flag that has been set via the master chain and fetch the partition information in response to detection of the enablement flag.

7. The computing system of claim 1, wherein the processor determines whether the blockchain transaction is associated with data stored on one blockchain or data stored separately on different blockchains via a transaction routing smart contract.

8. The method of claim 1, wherein the processor is configured to transmit the locations to a cross-chain handler configured to retrieve respective data from each of the different blockchains and execute the blockchain transaction based on the data retrieved from the different blockchains.

9. A method comprising:
   storing, via a master chain, partition information that links together storage across a plurality of blockchains;
   receiving a request to execute a blockchain transaction from a client;

determining whether the blockchain transaction is associated with data stored on one blockchain or data stored separately on different blockchains based on the partition information stored on the master chain; and in response to a determination that the blockchain transaction is associated with data stored separately on different blockchains, identifying, via the master chain, a location of each blockchain from among the different blockchains and transmitting the locations to a system configured to perform the blockchain transaction.

10. The method of claim 9, wherein the partition information identifies a domain of transaction data managed by the master chain, and identifies a sub-domain of the domain uniquely associated with each respective blockchain of the plurality of blockchains.

11. The method of claim 9, wherein the partition information identifies boundary ranges of transaction data maintained by each blockchain among the plurality of blockchains.

12. The method of claim 9, wherein the determining comprises individually querying the plurality of blockchains to determine at least one blockchain storing data for the blockchain transaction, when the master chain does not include an identity of a blockchain storing the data for the blockchain transaction.

13. The method of claim 9, further comprising establishing the partition information in response to detecting a consensus of the partition information from a plurality of blockchain nodes that manage the master chain.

14. The method of claim 9, further comprising detecting an enablement flag that has been set via the master chain and fetching the partition information in response to detection of the enablement flag.

15. The method of claim 9, wherein the determining is performed via a transaction routing smart contract executing on a blockchain node of the master chain.

16. The method of claim 9, wherein the transmitting comprises transmitting the locations to a cross-chain handler configured to retrieve respective data from each of the different blockchains and execute the blockchain transaction based on the data retrieved from the different blockchains.

17. A non-transitory computer readable medium comprising instructions, that when read by a processor, cause the processor to perform:

storing, via a master chain, partition information that links together storage across a plurality of blockchains;

receiving a request to execute a blockchain transaction from a client;

determining whether the blockchain transaction is associated with data stored on one blockchain or data stored separately on different blockchains based on the partition information stored on the master chain; and in response to a determination that the blockchain transaction is associated with data stored separately on different blockchains, identifying, via the master chain, a location of each blockchain from among the different blockchains and transmitting the locations to a system configured to perform the blockchain transaction.

18. The non-transitory computer readable medium of claim 17, wherein the partition information identifies a domain of transaction data managed by the master chain, and identifies a sub-domain of the domain uniquely associated with each respective blockchain of the plurality of blockchains.

19. The non-transitory computer readable medium of claim 17, wherein the partition information identifies boundary ranges of transaction data maintained by each blockchain among the plurality of blockchains.

20. The non-transitory computer readable medium of claim 17, wherein the determining comprises individually querying the plurality of blockchains to determine at least one blockchain storing data for the blockchain transaction, when the master chain does not include an identity of a blockchain storing the data for the blockchain transaction.

\* \* \* \* \*